(12) United States Patent  (10) Patent No.: US 9,179,239 B2
Morgaine  (45) Date of Patent: Nov. 3, 2015

(54) METHOD AND SYSTEM FOR MANAGING, DELIVERING, DISPLAYING AND INTERACTING WITH CONTEXTUAL APPLICATIONS FOR MOBILE DEVICES

(75) Inventor: Sylvain Morgaine, Neuilly-sur-Seine (FR)

(73) Assignee: Netmeno, Paris (FR)

( * ) Notice: Subject to any disclaimer, the term of this patent is extended or adjusted under 35 U.S.C. 154(b) by 152 days.

(21) Appl. No.: 13/642,167

(22) PCT Filed: Apr. 19, 2011

(86) PCT No.: PCT/IB2011/051697
§ 371 (c)(1),
(2), (4) Date: Oct. 19, 2012

(87) PCT Pub. No.: WO2011/132148
PCT Pub. Date: Oct. 27, 2011

(65) Prior Publication Data
US 2013/0040626 A1  Feb. 14, 2013

Related U.S. Application Data

(60) Provisional application No. 61/325,538, filed on Apr. 19, 2010.

(51) Int. Cl.
*H04W 4/00* (2009.01)
*H04W 4/02* (2009.01)
(Continued)

(52) U.S. Cl.
CPC .................. *H04W 4/00* (2013.01); *H04L 67/18* (2013.01); *H04W 4/001* (2013.01); *H04W 4/003* (2013.01);
(Continued)

(58) Field of Classification Search
CPC ...... H04W 64/003; H04W 4/02; H04W 4/008; H04W 4/023; H04W 4/25
USPC ................................................ 455/456.1–457
See application file for complete search history.

(56) References Cited

U.S. PATENT DOCUMENTS 7,072,672 B1 * 7/2006 Vanska et al. .............. 455/456.3
7,194,689 B2 * 3/2007 Manni et al. .................. 715/735
(Continued)

FOREIGN PATENT DOCUMENTS

WO  2004040923 A1  5/2004
WO  2009027121 A1  3/2009

OTHER PUBLICATIONS

Syukur E. Et al; "Hanging services: An Investigation of Context-Sensitivity and Mobile Code for Localised Services", Mobile Date Management, 2004, Proceedings 2004 IEE International Conference on Berkely, CA, USA Jan. 19-22, 2004, pp. 62-73.
(Continued)

Primary Examiner — Marisol Figueroa
(74) Attorney, Agent, or Firm — Banner & Witcoff, Ltd.

(57) ABSTRACT

It concerns a method for delivering temporarily a plurality of software applications each based on respective contextual data, to one or more wireless mobile end-user devices (13), by using a single application called contextual engine pre-installed in said mobile devices (13), said delivery being limited to the immediate vicinity of specific locations comprising the steps of (i) receiving on a local device (9) located in the vicinity of one of said specific locations a remote request from one of said mobile end-user devices (13) located near said local device (9) for retrieving one of said plurality of applications related to its respective contextual data, (ii) receiving on said local device said application from a remote server (5), (iii) delivering automatically from said local device (9) exclusively said software application to said mobile end-user device (13) via a wireless connection (12), and (iv) displaying said application on said mobile end user device (13).

17 Claims, 12 Drawing Sheets

(51) Int. Cl.
*H04L 29/08* (2006.01)
*H04M 1/725* (2006.01)
*H04W 8/24* (2009.01)

(52) U.S. Cl.
CPC ............ *H04L 67/34* (2013.01); *H04M 1/72525* (2013.01); *H04M 1/72572* (2013.01); *H04W 4/02* (2013.01); *H04W 8/245* (2013.01)

(56) References Cited

U.S. PATENT DOCUMENTS

| | | | |
|---|---|---|---|
| 7,353,274 B1* | 4/2008 | Rouhi et al. | 709/225 |
| 2001/0048736 A1* | 12/2001 | Walker et al. | 379/88.23 |
| 2002/0087621 A1* | 7/2002 | Hendriks | 709/203 |
| 2002/0122055 A1* | 9/2002 | Parupudi et al. | 345/737 |
| 2005/0054326 A1* | 3/2005 | Rogers | 455/410 |
| 2005/0132049 A1* | 6/2005 | Inoue et al. | 709/225 |
| 2007/0037578 A1* | 2/2007 | Besterman | 455/445 |
| 2008/0153512 A1 | 6/2008 | Kale | |
| 2009/0158400 A1* | 6/2009 | Miyake | 726/4 |
| 2014/0256287 A1* | 9/2014 | Flynn et al. | 455/410 |

OTHER PUBLICATIONS

Josa A. CR Viterbo et al; "A Middleware Architecture for Context-Aware and Location-Based Mobile Applications", Software Engineering Workshop, 2008, SEW 08, 32nd Annual IEEE, IEEE, Piscataway, NJ, USA, Oct. 15, 2008, pp. 52-61.

International Search Report of PCT/IB2011/051697 dated Jun. 9, 2011.

\* cited by examiner

METHOD AND SYSTEM FOR MANAGING, DELIVERING, DISPLAYING AND INTERACTING WITH CONTEXTUAL APPLICATIONS FOR MOBILE DEVICES

FIELD OF THE INVENTION

The present invention broadly relates to mobile Location-Based Services (LBS) even though geo-location coordinates are not required for invention. Specifically, the invention allows for a single mobile application to adapt its functionality, in real-time, based on context data associated with multiple providing locations.

BACKGROUND AND RELATED ART

As mobile applications become more and more widespread amongst smart phones such as the iPhone, Blackberry, Nokia N Series, LG POP, Samsung Galaxy, Palm Pre, Google Nexus One, and more recently new tablet computers such as Apple's iPad, users will need to manage an ever-increasing number of applications inside these devices.

Even though phone makers have began to provide User-Interface (UI) solutions to allow users to group, access and launch their applications faster and more easily, these become necessarily inefficient as the number of applications grows dramatically inside the device, hence requiring the user to manually arrange or delete applications according to their own usage. Furthermore, once many applications have been installed on the mobile device, it becomes harder for a user to remember which set of applications can be used in a particular setting, at a particular time and for a particular use or context.

Certainly, there are mobile applications implementing Augmented Reality techniques and more generally Location-Based Services which, if and only if the user agrees to be geo-localized, can bring a plurality of information or services based on that location. Yet, these applications are designed to gather information from data associated with GPS, GSM triangulation techniques and the like to display a predefined UI based on that data, which necessarily makes it difficult for said applications to perform an entirely new functional behavior based on what the user can do in the particular context.

U.S. patent application (Ser. No. 12/041,971) describes a method for computing a novelty index value based on the location of the user. The method specifically allows to display on the mobile terminal appropriate recommendations or personalized information determined by where the user is or how often he has been in a particular location. Because the resulting display is configured from applications that are "set in the device", this limits the range of possibilities to the ones that have been pre-installed in the mobile phone.

Other systems such as mentioned U.S. Pat. No. 7,058,895 describe a method and a conceptual structure allowing users to customize their mobile terminal based on their own preferences. This method requires the user to manually pre-define his contextual preferences by using a PC application to build the said conceptual structure by adding nodes to a conceptual graph. Among other this method presents the disadvantages of forcing the user to use a PC application in order to benefit from the adaptive UI on the mobile device therefore complexifying the process for the user while increasing the time to operate.

U.S. Pat. No. 7,590,681 describes a method and a system for managing and delivering web content for internet appliances. The patent involves letting a user customize the display of web content on an internet appliance such as mobile phone, PDA, and the like.

This method forces the user to manually configure his device and the type of content to be displayed when using this device, adding complexity and Lime to operate for an average mobile-device user.

US Patent 2010/0042463 describes a software or hardware facility for providing an enhanced shopping experience. The proposed invention determines user characteristics such as location (location, population density, etc.) or demographic (age, gender, occupation, etc.) and consolidates these results with the mobile device's characteristic such as its location or its identifier. The resulting data is used to retrieve product and shopping information based on advertiser-defined parameters.

The invention of the above mentioned document uses different context modules in order to determine which is the best product offer to display on the user's mobile device. However, the invention relates to product queries in relation to user and mobile characteristics and requires the device to have previously stored a delivered message which implies that the client software needs to have been pre-programmed to do so. This further implies that no application other than the ones capable of interfacing with said software or hardware facility can be operated by the user contrarily to what is claimed by the present invention.

SUMMARY OF THE INVENTION

The method, and system of the invention for delivering context-based mobile applications in real-time or near real-time, eliminates the need to search, install or launch relevant applications based on their availability at a particular location and according to a particular context. This overcomes the technical limitations and/or disadvantages of the above systems.

Because the application is never resident on the device, the proposed method solves the problem of having to remember which application can be used in a specific environment and whether it has already been downloaded. The system also eliminates the need to find the application in question on the mobile device in order to launch it.

Furthermore, the method according to the invention enables the automatic substitution of content on the mobile devices' display as the user moves from one context to another etc.

The invention more generally describes a method for delivering a plurality of individual mobile applications based on the user's contextual environment. Specifically, the invention allows for a single application to adapt its functionality, in real-time, based on context data associated with the providing location, and hence giving the user the ability to interact with an infinite number of different applications without the need to search, install or launch any of them.

In other words, the method allows delivering of a plurality of applications to mobile devices, based on contextual data available in the immediate surrounding of a user's location. In a preferred embodiment, the method uses a system having a contextual engine application installed on the mobile devices, for retrieving the contextual data and displaying the applications, several contextualizer devices being located in different places and being arranged to connect wirelessly to the mobile devices present in the surroundings to deliver the appropriate application to the mobile device.

It should be understood that by contextual data it could be local or temporal, and that one should understand on every broad sense, localization, time, user' activity (i.e. for example, shopping, watching TV, etc), identity or any other data related to the specific context in the environment of the mobile device, which could be non limitatively the weather, the inside or outside temperature through a local sensing device, the character of the visit (activity) of the user of the mobile device in the localization based on various criteria such as the RFM criteria (Recency, Frequency, Monetary) etc.

An other aspect of the invention is to provide a method for delivering temporarily a plurality of software applications each based on respective contextual data, to one or more wireless mobile end-user devices, by using a single application called contextual engine pre-installed in said mobile devices, said delivery being limited to the immediate vicinity of specific locations comprising the steps of (i) receiving on a local device located in the vicinity of one of said specific locations a remote request from one of said mobile end-user devices located near said local device for retrieving one of said plurality of applications related to its respective contextual data, (ii) receiving on said local device said application from a remote server, (iii) delivering automatically from said local device exclusively said software application to said mobile end-user device via a wireless connection, and (iv) displaying said application on said mobile end user.

By immediate vicinity one should understand within a few meters to two or three hundred meters, advantageously fifty to sixty meters.

A specific location should be understood very broadly. It could be a store, a parking lot, an office building, a gallery, an apartment, a house, etc. . . .

Advantageously the applications are stored on at least one virtual internet server.

In preferred embodiments, not limitatively listed hereafter:
the mobile devices are mobile phones;
the contextualizer devices are wireless routers;
the contextual engine is a native application installed on the mobile device; the contextual engine enables the delivery of applications without requiring the user to search, install or launch said application(s);
a web-based administration module on said virtual server is used to create and manage a network of contextual environments whereby a web-application can be delivered in accordance with different parameters defined by an operator;
the applications are developed using a graphical application builder tool connected to said virtual server;
the contextualizer devices are connected to the internet directly or via wired routers;
the contextualizer device contains a specific firmware programmed according to the invention;
the contextualizer devices comprise a Wifi antenna and/or an RFID antenna;
the contextualizer device is embedded within an internet appliance such as a TV set-top box, internet-enabled TV, home router, printer, media center or kitchen appliance;
the firmware program restricts access to a range of IP addresses defined in a database administration console stored on said virtual internet server;
the firmware program returns a Unique Device ID (UDID) once the wireless connection between said mobile device and said contextualizer device has been established;
the UDID is the Universal Plug and Play identification (UPnP ID) of said contextualizer device;
the UDID is the Media Access Control (MAC) address of said contextualizer device;
the web-application comprises one or many components that can be saved as dynamic cookies (which can expire or be automatically updated) inside said contextual engine application;
an expiring period (date and time) is associated to said components preventing the end-user from operating this component once expired. The association is made through an administrative console on the virtual server;
operating an expired component requires the end-user to extend said expiring period through a transaction;
the transaction involves sharing the said component via a social network, purchasing or trading points in exchange for extending said expiring period;
the method further comprises probing for a different Unique Device Name (UDN) corresponding to a switch in contextualizer device and displaying said appropriate web application or component;
the method further comprises tracking the time spent by the end-user in a particular zone covered by said contextualizer and storing the associated activity from said web application or said component.

Another object of the invention is also to propose a system for managing, delivering, displaying and interacting in real-time with mobile device applications based on contextual data available at the user's location according to the method here above mentioned.

Advantageously the user implicitly agrees to have the information/application "pushed" to him/her since he/she deliberately launches the application without receiving any previous message and all transactions and tracking are anonymous or otherwise explicitly authorized by the end-user.

Advantageously a web application component is text for instance) can be modified by a third party independently from the main application (collaborative marketing) in order to update the context of a particular location.

In another advantageous embodiment, said components can update the web application automatically via an external data source such as an RSS feed, an instant message, a sensor output, or the like.

Another object of the invention is to provide a process and a system where there is no need for the user to manually switch access points, no need to enter security key, where when the user exits the "context zone" the application is no longer available which adds to the security level, especially when using a financial transaction.

With the invention it will be possible to launch (as a setting option) an existing application based on location. An other object of the invention is to propose a contextualizing device which can tell the contextual engine to display only the applications that can be used in that particular location.

With the invention the exact same architecture can be used to deliver context-aware content for any web-compatible device (PC, Tablet, PDA, game console).

It will be obvious for the man skilled in the art that important differences exist between the contextual engine of the invention and a browser.

Web browsers such as Internet Explorer, Safari, or Firefox can automatically display the home page of a web site once connected to the internet. Nevertheless, said browsers can only be set to access a specified URL either defined by the access provider or the user but are not capable of integrating or combining data provided by other local wireless technologies such as RFID, Bluetooth, local sensors or the like.

More particularly, a web browser does not include any means for automatically detecting that the user is switching to a new wireless access point, making it difficult to substitute a new UI based on new context, which is one of the crucial aspects of the invention.

Moreover, a web browser is meant to allow the end-user to explore an unlimited number of web destinations. This is done by providing a URL or clicking on webpage links. Whereas the invention limits and locks the web application to the user's current context in order to provide the most relevant mobile service for the user's activity.

BRIEF DESCRIPTION OF THE DRAWINGS

The accompanying drawings which are incorporated in and form part of the specification, illustrate some embodiments of the present invention, and together with the description serve to explain the principles of the invention.

DETAILED DESCRIPTION OF EMBODIMENTS

As indicated above the present invention describes a method and a system for managing, delivering, displaying and interacting in real-time with mobile device applications based on contextual data available at the user's location.

By mobile device we mean any mobile telephone, personal digital assistant, notepad, tablet, netbook and the like equipped with wireless connectivity such as 3G/4G, Wifi, Bluetooth, or NFC.

The method eliminates the need to search, install or launch contextually or location-relevant applications by delivering these applications on the fly, using a single application which we refer as contextual engine hereafter.

Specifically, the invention allows said contextual engine to adapt its functionality, in real-time, based on context data associated with the providing location, and hence giving the user the ability to receive and interact with an unlimited number of different applications modules.

The key feature of the invention is that said contextual engine has no pre-defined functionality, it will inherit its "function" for example from a distant server via a wireless access point which we refer as contextualizer hereafter.

Unlike contextualized interactions described in the prior art, the system described in the present invention does not require the mobile device to "know" the type of data that is available at the location of the user nor does it need to process this data using pre-installed applications. Moreover the system does not necessarily rely on geo-localization techniques in order to display applications that are suitable for interaction at the user's location.

Figure 1:
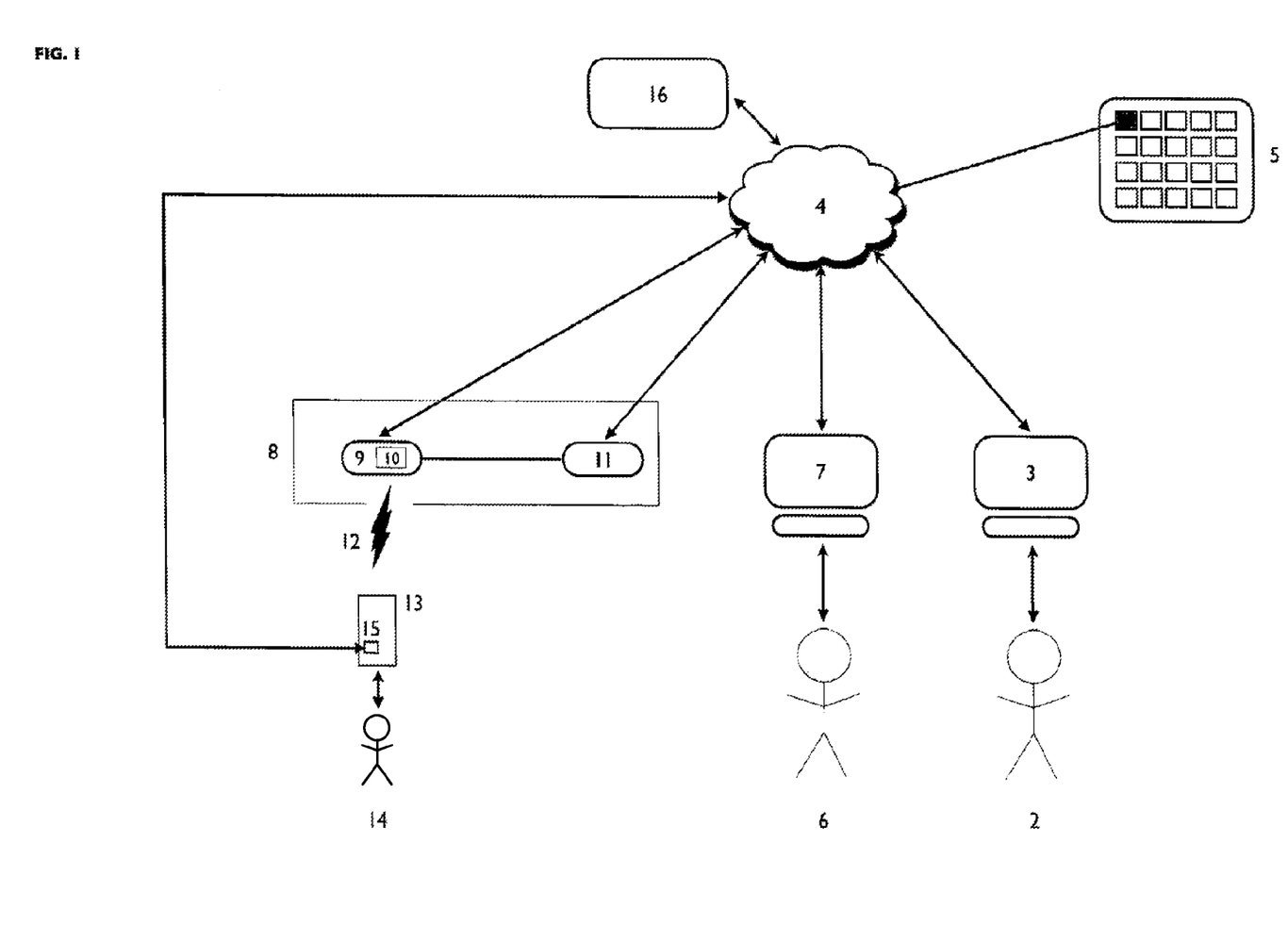
FIG. 1 shows an overview diagram of one embodiment of the invention.

In one embodiment of the invention, FIG. 1 shows an overview diagram of system 1 comprising a web based administration console 3 connected to a virtual server 5 via the internet 4—An administrator user 2 logs into said console to create and configure an operator 8. Said operator is defined as a physical location including said contextualizer device 9 which can be either directly connected to the internet 4 or through a routing device 11. An online graphical application builder tool 7 is used by a content designer 6 to create a packaged web-application which is then stored on said virtual server. Once the operator is created with said associated web application, an end-user 14 can launch said contextual engine on mobile device 13 in operator location setting 8. As soon as the contextual engine is launched, a wireless connection 12 is established between mobile device 13 and said contextualizer device using a specific firmware module 10. Said firmware module checks the limit of allocated IP addresses and the authorized DNS and Web content queries through a firewall. If all operating conditions are met, the firmware returns the device type of said contextualizer alone with its Unique Device Name (UDN) to the mobile device. The associated web-application is then instantly loaded from virtual server and displayed on the end-user's mobile device.

Figure 7:
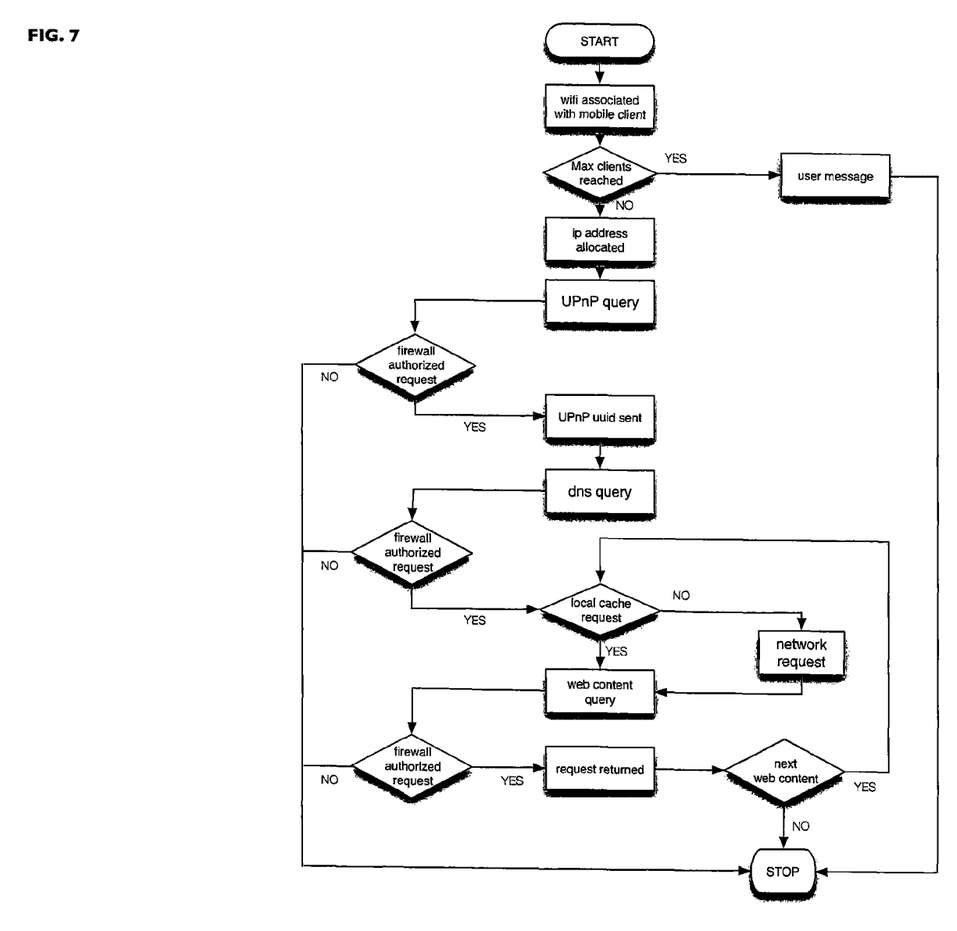
FIG. 7 is an example of the basic control flow of a firmware module according to the embodiment of FIG. 1.

FIG. 7. shows the basic control flow of said firmware module.

To decrease the time needed by the end-user to connect to contextualizer and receive the associated web-application, a UPnP protocol is used and the UPnP ID of the contextualizer device is registered in the administration console. This registration procedure, along with the automatic connection (aka "auto-join") to a known wireless access point, allows the launched contextual engine to automatically display said web-application without any action required from the end-user.

Figure 2:
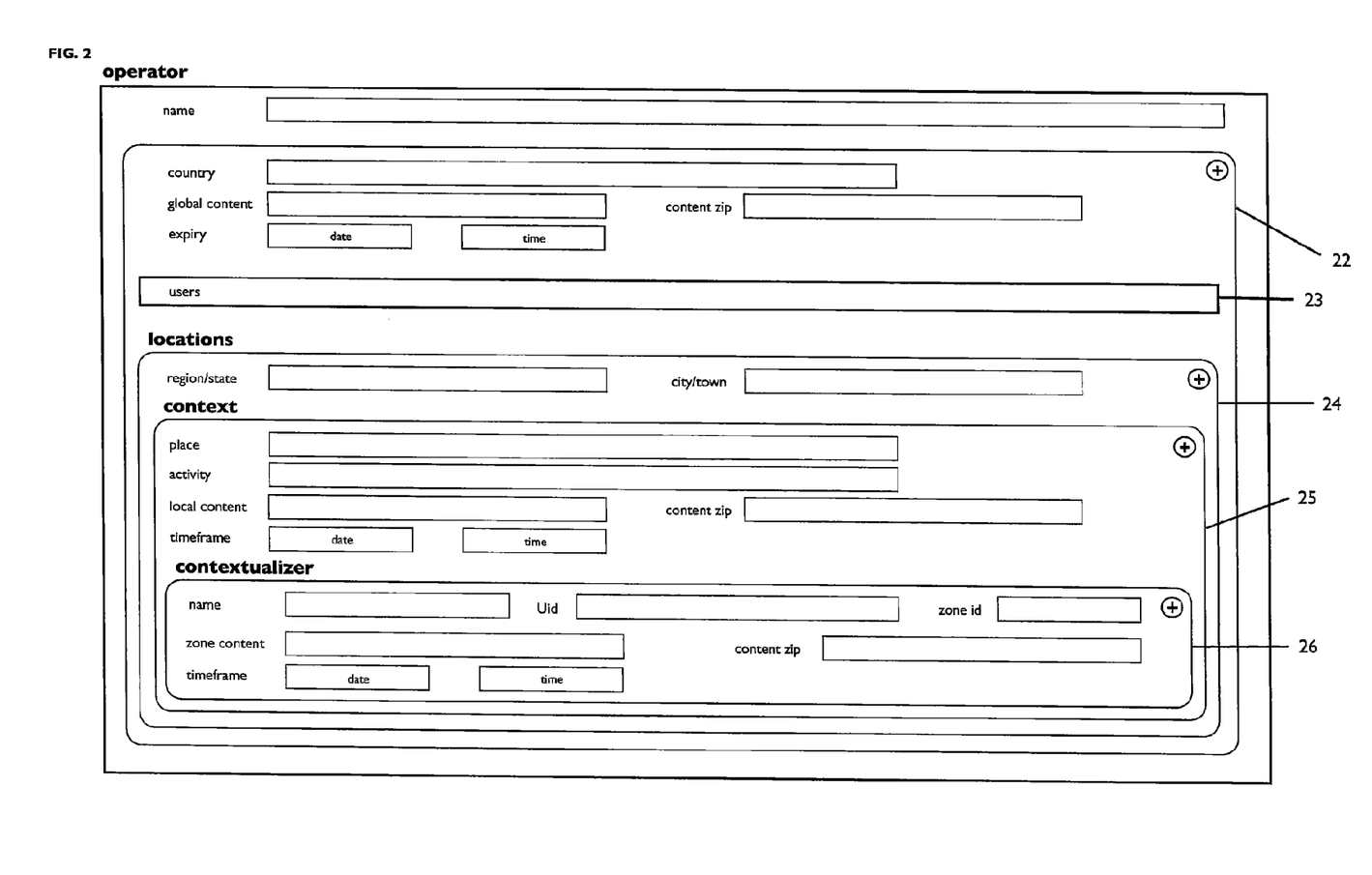
FIG. 2 shows an example of an administration console information model to be used according to an embodiment of the invention.

FIG. 2 shows said administration console information model, according to an embodiment of the invention. The console is used to create and manage a network of contextual environments whereby web-applications can be delivered in accordance with different parameters defined by an operator.

The operator's name is set in said administration console. Once set, one or a plurality of contexts can be associated with said operator. The information model easily allows an operator to manage said network across a wide range of contexts and geographic locations.

Four information blocks 22,24,25 and 26 can be instantiated depending on how many contexts need to be created.

Block 22 allows to create the countries where the contextualizer(s) need to operate. If the "global content" field is specified then the associated web content in field "content zip" will be displayed first upon launching the contextual engine. The "expiry" field determines when this content should no longer be active (visible) on the mobile device.

Block 23 determines the type of users authorized to use the administration console and the administrative rights thereof.

Block 24 allows to create all the regions and cities for each country.

Block 25 defines the context such as the physical "place" where the contextualizer devices are located, the "activity" such as the typology of end-user interactivity (mobile couponing, product ordering, flash sales, general information, social networking, etc.)

Block 26 is used to add and configure the contextualizer devices in each "place" defined in Block 25. The UPnP ID of the contextualizer device is entered in the field "Uid" which is used after the wireless connection is established in order to fetch the right web-application content on the virtual server.

Figure 3:
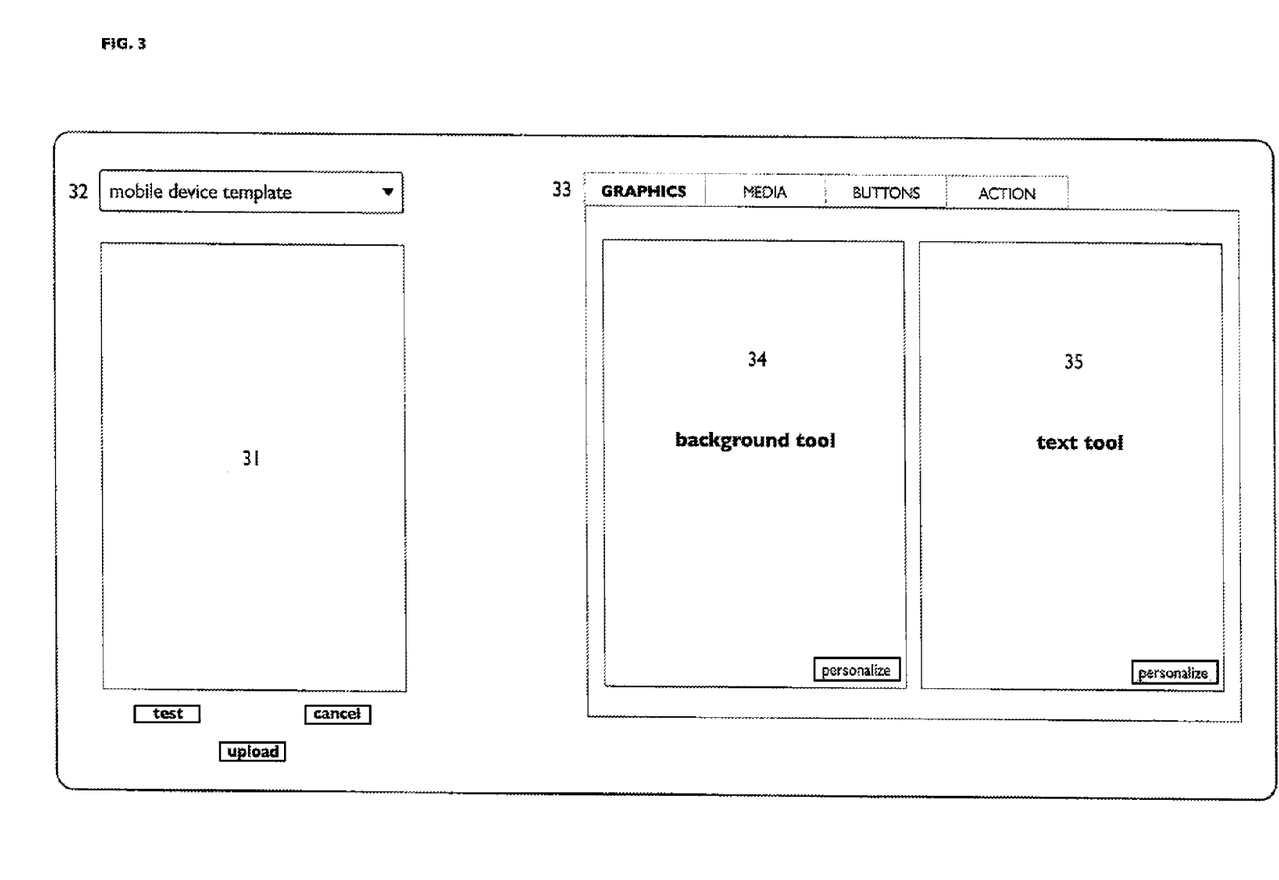
FIG. 3 shows an example of an online graphical application builder tool to be used with an embodiment of the invention.

FIG. 3 shows said online graphical application builder tool. A template 32 is first chosen to define the resolution 31 of the mobile device. A menu 33 of graphical elements and functional attributes allows to define the layout and interactivity for each screen of said web application by simply dragging elements from the asset areas 34,35 to the screen 31. Once all, the content of the web application is created, it is saved and uploaded using the "content zip" fields of said administration console FIG. 2.

Figure 4:
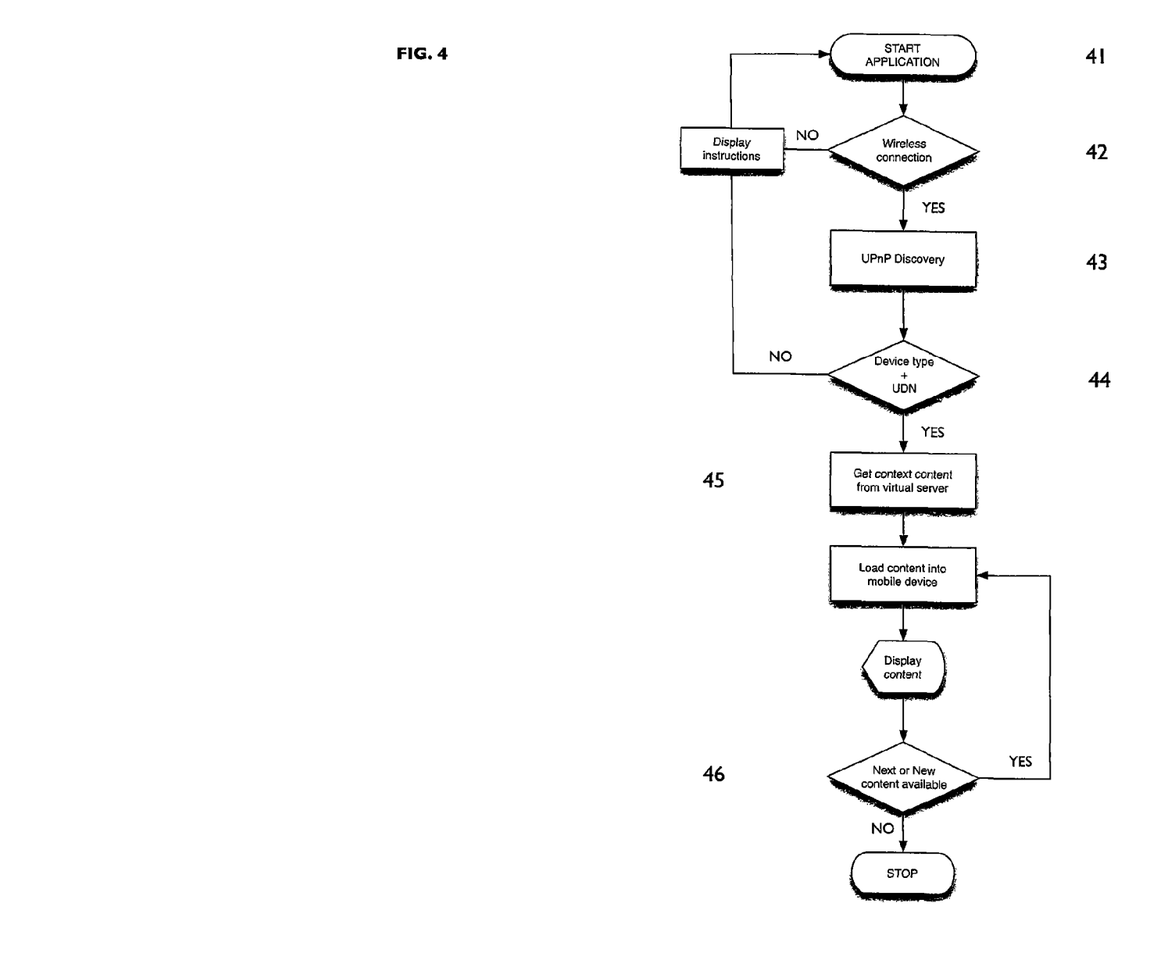
FIG. 4 shows a main flow diagram of a contextual engine according to an embodiment of the invention.

FIG. 4 shows the main flow diagram for said contextual engine. When the end-user starts the contextual engine 41, it tries to detect a contextualizer device 42. If said contextualizer is detected then its UDN (Unique Device Name) is sent to the contextual engine over a UPnP protocol. To speed-up the discovery of the contextualizer, the contextual engine enables the asynchronous notification of UMP packets. Once the UDN 44 has been transmitted, the contextual engine makes a request 45 to said virtual server which send the context attributes associated with the contextualizer to the mobile device. Said unique uPnP ID is requested from the virtual server in JSON (JavaScript Object Notation) format. The response is a list of unique content URLs that can be loaded into the content view of the mobile device. Said content view is then ready to load the first item in the list. If additional or updated content data is available 46, then it is loaded from the virtual server into said mobile device.

In another embodiment of the invention, the contextualizer device is connected to a network switch via a wired-connection.

In another embodiment of the invention, a wireless-payment module can be integrated within the web-application. This module allows the end-user to remotely pay for a particular product or service based on a virtual money exchange procedure described in FIG. 5

Figure 5:
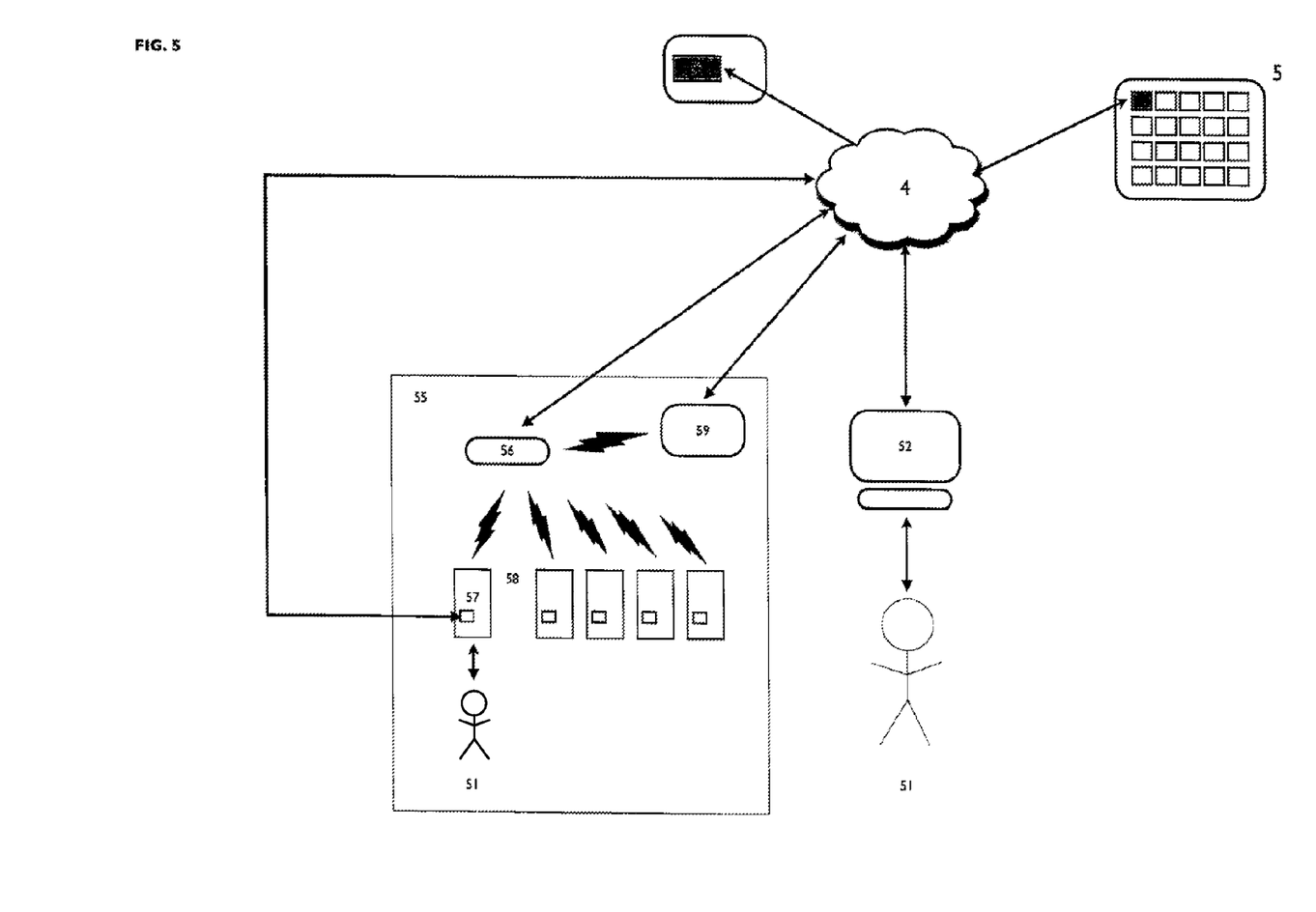
FIG. 5 is an other embodiment with a wireless payment module according to an embodiment of the invention.

Prior to being able to use said module, the end-user 51 logs into his personal internet profile 52 and adds money to his virtual wallet 53. The method by which the end-user adds money to his virtual wallet uses well known internet-based payment platforms such as PAYPAL or PAYTHRU and is not described any further. Upon completion of this process, the end-user can walk into a store 55, for example a coffee shop, equipped with said contextualizer device 56 and launch contextual engine 57. The store's contextual web-application is then received from virtual server 58 and displayed on mobile device 58. An example scenario of the ordering process is described in FIG. 6. Once the end-user has validated his order, the order is transmitted to the store's order queue on a tablet device 59 as described in FIG. 10.

Figure 6:
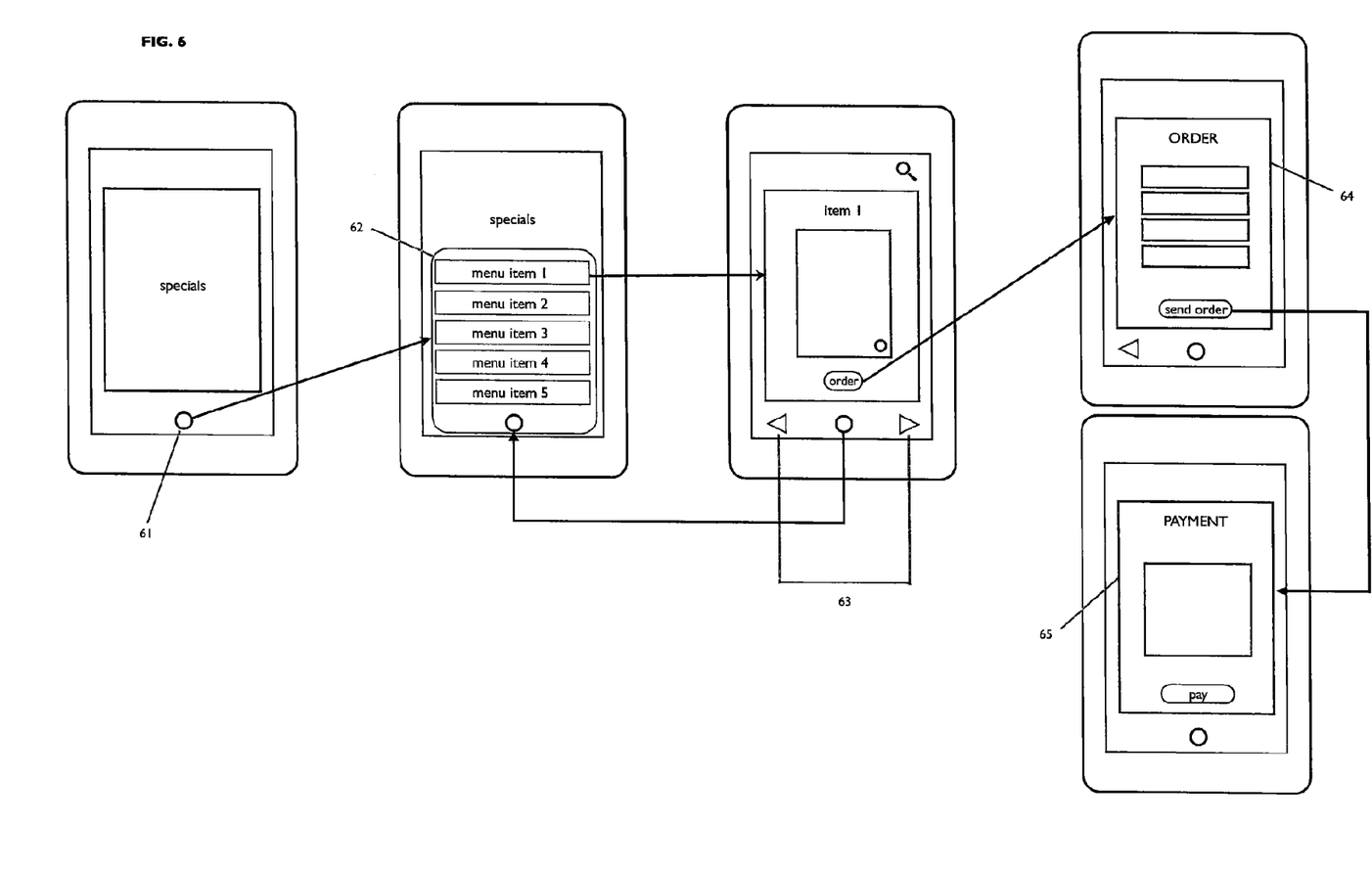
FIG. 6 shows a generic ordering scenario used in an embodiment of the invention.

FIG. 6 shows a generic ordering scenario where upon launching the contextual engine, the end-user receives a first screen indicating general information and the specials of the day. By selecting the contextual menu button 61, the end-user makes his selection(s) 62 among the different menu items. Once the menu item is selected, he can browse the different selections using standard "previous" and "next" buttons 63. An "order" button allows to confirm the selection(s) and summary of all ordered items are displayed on screen 64. To send the order to be prepared the end-user presses "send order". A payment screen 65 is displayed, showing the balance of the end-user and a "pay" button terminates the order. Said order is then transmitted to the store's order queue on a tablet device with the name and order number of the end-user. When the order is ready, the order number is announced for the end-user to pick-up.

Figure 8:
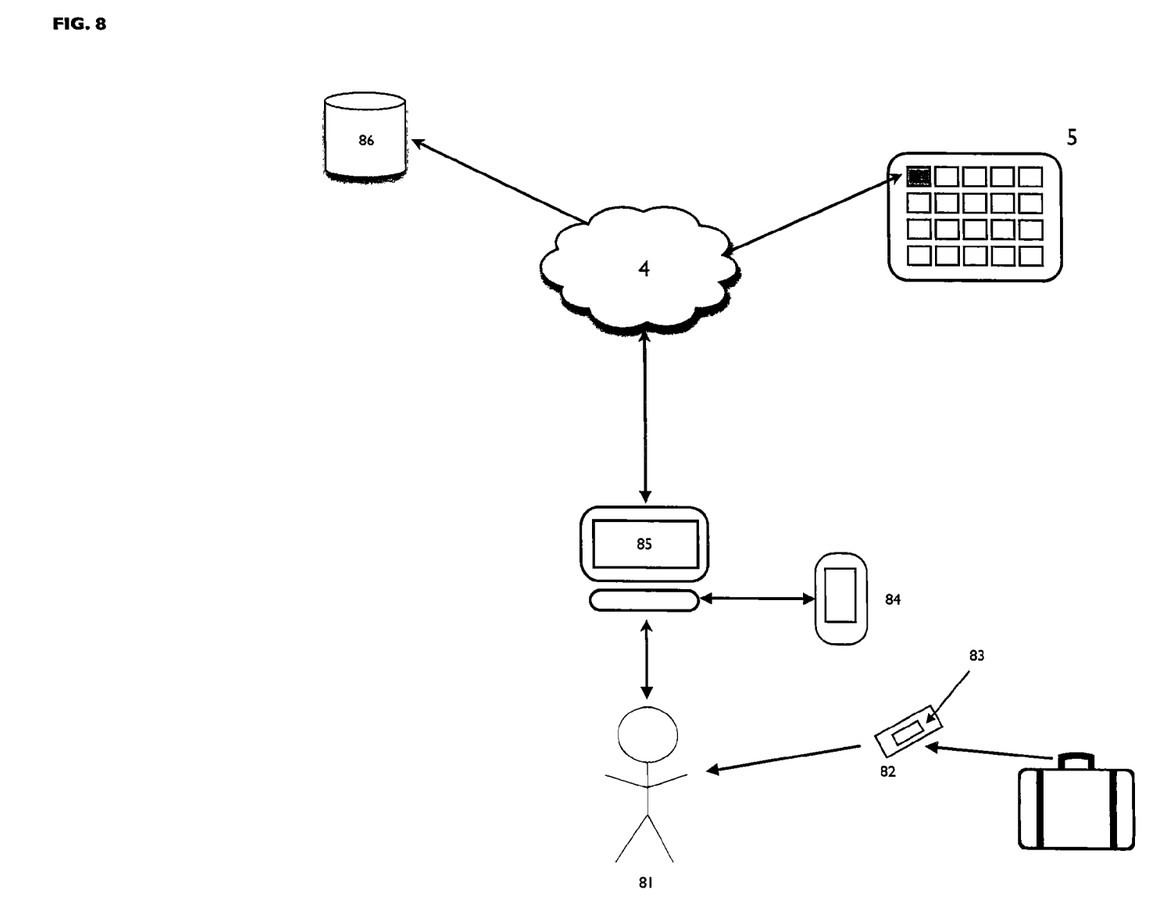
FIG. 8 and FIG. 9 show an application with suitcase identification.
Figure 9:
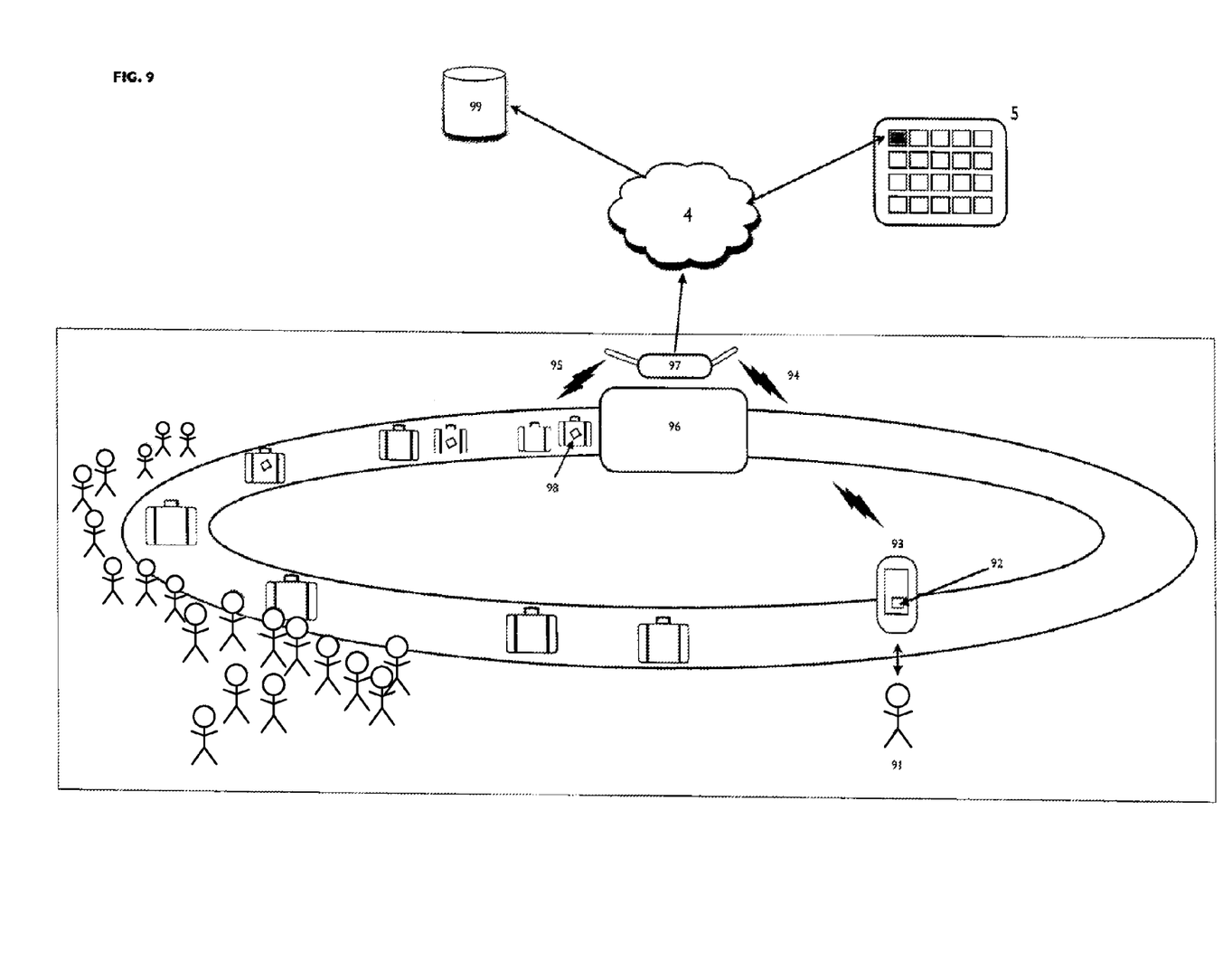

In another embodiment of the invention, FIG. 8 describes a method for associating a passenger's mobile device ID with an RFID chip embedded inside a suitcase and FIG. 9 shows the associated system for alerting said passenger when his suitcase enters the baggage claim carousel.

In FIG. 8, the end-user 81 scratches a label 83 on the suitcase's identifying tag 82. The serial number revealed is then registered in a secured web page 85 along with the name and address of the end-user. To complete the registration of the suitcase, the end-user connects his mobile device 84 to his PC using a USB connection. When he clicks on the "register" button inside said secured web page, a local application on the PC is automatically launched and reads the Unique Identification (UID) number of the mobile device. If said UID is not already registered on virtual server 5 then a data entry is created and the UID of the mobile device is stored along with said serial number. If the UID already exists, then the serial number is just added to the record. The name, address and serial number are also registered on the suitcase manufacturer's secured online database 86. This procedure can be extended to additional users such as family members with their own RFID-enabled suitcases.

In FIG. 9, the now registered passenger 91 can launch said contextual engine 92 anon arrival at the baggage claim 96. The mobile device 93 then performs the steps described in FIG. 3. to automatically retrieve the web application from the contextualizer device 97. In this particular embodiment of the invention, said contextualizer device comprises two wireless communication channels. A first RFID reader 95 is used to scan all suitcases as they are delivered at the baggage claim and a second Wifi channel 95 for sending the web application to the mobile device of the passenger. Once the web application is loaded, it displays a message such as "YOUR LUGGAGE IS NOT YET ON THE BELT—Please wait . . . ". Once the RFID reader detects an RFID chip from an equipped suitcase, the serial number is checked against said virtual server database entry as well as said manufacturer's online database. If the serial number is found then the message automatically changes to "SUITCASE OF <name of passenger> HAS BEEN DELIVERED ON BELT # <belt number>".

Figure 10:
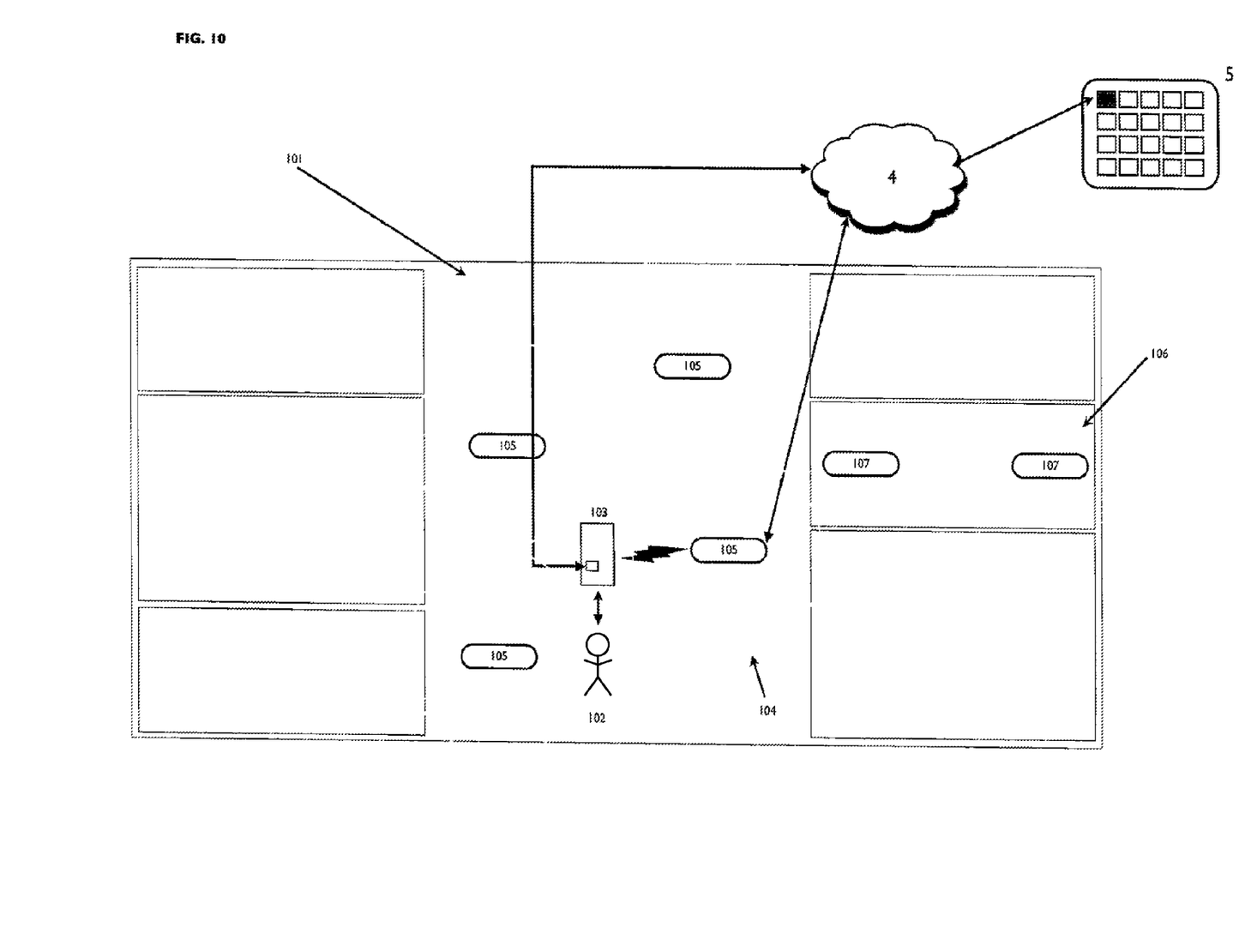
FIG. 10 describes a user scenario according to an embodiment of the invention.

FIG. 10, describes a preferred user scenario according to the invention, where the end-user 102 enters a mall 101 and launches said contextual engine 103. A plurality of contextualizer devices 105 are arranged to cover said mall in such a way that the user automatically connects to the nearest device as he walks through the space. The distance between two said devices may not exceed 20 m with directional antennas defining a small signal footprint 104 in order to facilitate the change in context across multiple zones. In the present scenario, a web application is delivered to the end-user, as described in FIG. 4, indicating a promotion in a specific store 106.

Figure 11:
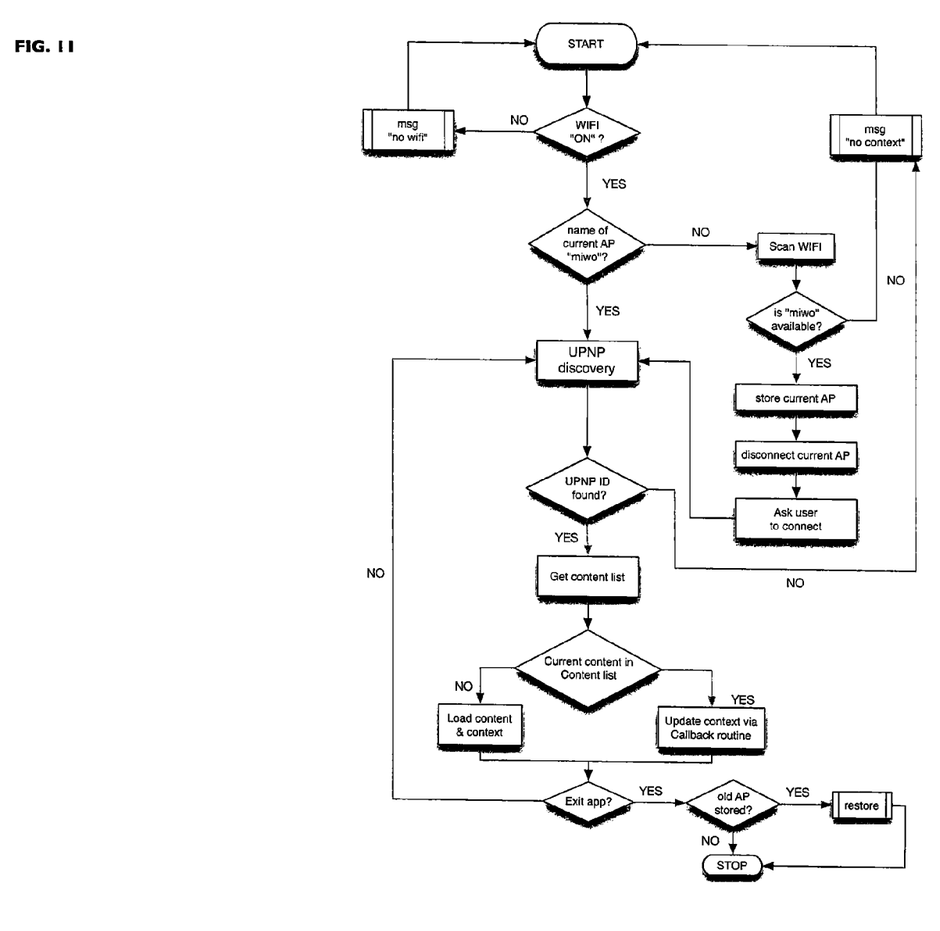
FIG. 11 is a flowchart used by one of embodiment of the invention.
Figure 12:
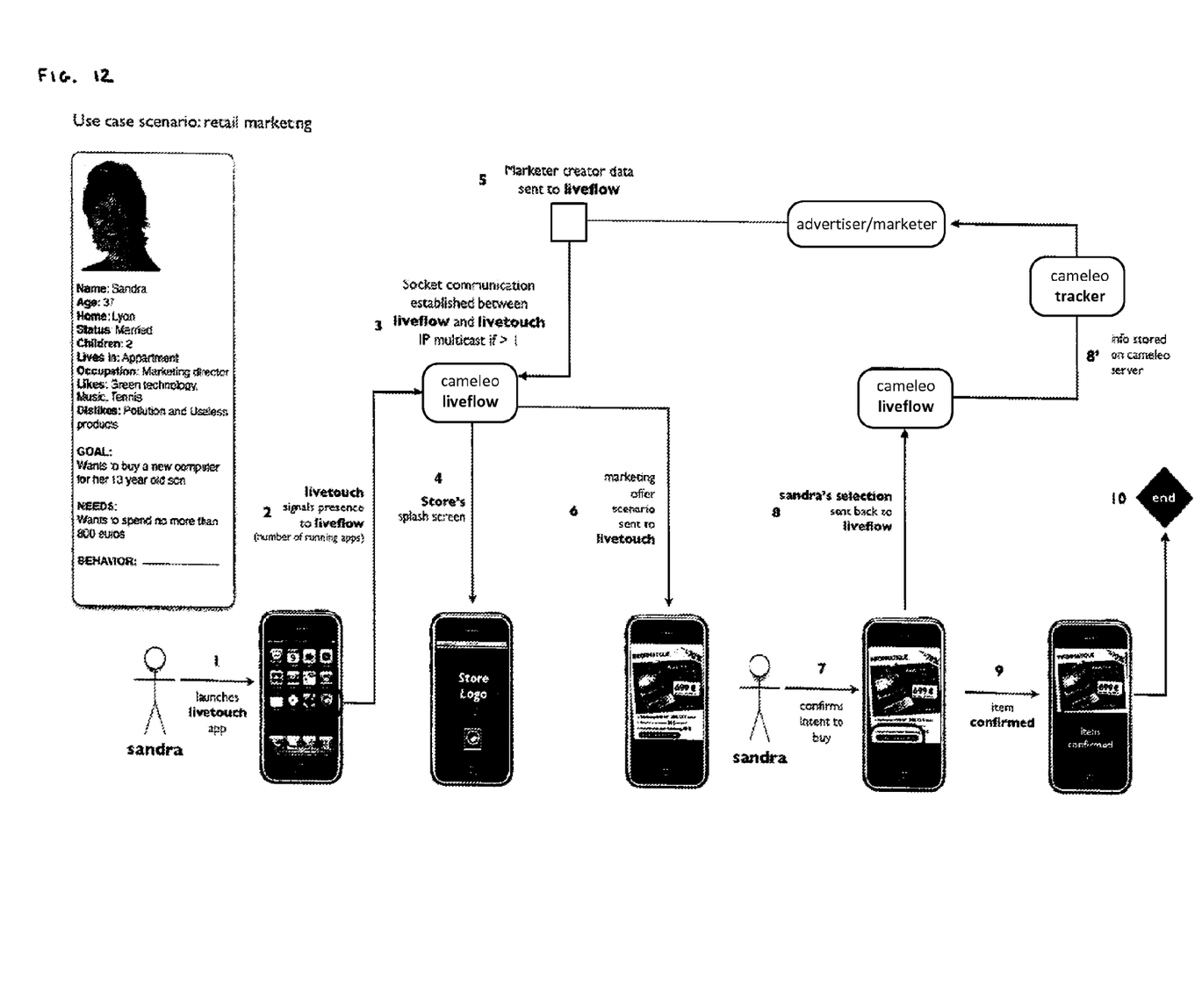
FIG. 12 shows an example of a case scenario in retail marketing usable with a process and system according to an embodiment of the invention.

Another set of contextualizer devices 107 are equally positioned in said store in order to provide an alternate web application on the end-user's mobile device as he enters said store. Said alternate web application displaying said promotion is automatically substituted to the one available inside the mall area as the contextual engine detects any of the store devices 107 and fetches the associated content stored on virtual server 5. FIG. 11 describes the flowchart used by one embodiment of the invention for automatically substituting a new content based on the user walking into a new context.

The invention claimed is:

1. A method for delivering temporarily a plurality of software applications each based on respective contextual data, to one or more wireless mobile end-user devices, by using a single application called a contextual engine pre-installed in said one or more wireless mobile end-user devices, said delivery being limited to the immediate vicinity of specific locations, comprising the steps of:
   (i) receiving on a local device located in the vicinity of one of said specific locations a remote request from an end-user device, the end-user device being one of said one or more wireless mobile end-user devices and located near said local device for retrieving one of said plurality of applications related to its respective contextual data,
   (ii) receiving on said local device said application from a remote server,
   (iii) delivering automatically from said local device exclusively said software application to said end-user device via a wireless connection, and
   (iv) displaying said application on said end-user device, and wherein
      one or several display components are saved as dynamic cookies by said contextual engine of said end-user device,
      said dynamic cookies are shared with one or more users using a social networking site,
      an expiring period is associated with said one or several display components and said end-user device is disabled, once the expiring period is passed, from operating said one or several display components, and
      the expiring period is extendable through a transaction via said end-user device, and such transaction involves sharing, purchasing or trading points in exchange for extending said expiring period.

2. The method according to claim 1 wherein, said end-user device having a touch sensitive digital screen, the method further includes the following steps:
   (v) generating at least a processing instruction via said touch sensitive digital screen and
   (vi) delivering said processing instruction to the local device for further processing.

3. The method according to claim 1 wherein, said locations being each respectively related to said respective contextual data, the method further comprises the steps of:
   (vii) moving said end-user device to a second location; and
   (viii) repeating the precedent steps for a second software application different to the first one corresponding of the context of the second location.

4. The method according to claim 1, wherein the remote server is cloud-based.

5. The method according to claim 1, wherein a plurality of software applications, each based on contextual data corresponding respectively to a plurality of specific locations, being stored on said remote server, the method includes a first remote request by said end-user device for temporary retrieval of a first application at a first location and a second remote request for later temporary retrieval of a second application at a second location, said mobile end-user device using said contextual engine, in real time or near real-time.

6. The method according to claim 1, wherein said software application becomes inaccessible from said end-user device when said end-user device is retrieved from the location of the corresponding establishment.

7. The method according to claim 1, wherein the application is transmitted between the end-user device and the local device by radio electric waves means such as Wifi, Bluetooth or NFC.

8. The method according to claim 1, wherein the local device is a wireless router.

9. The method according to claim 1, wherein the end-user device is a mobile phone or a tablet.

10. The method according to claim 1, wherein said local device comprises a specific firmware program arranged to restrict access to said remote server and speed the delivery of content to said end-user device using a local cache procedure.

11. The method according to claim 10, wherein said firmware program returns a Unique Device identification once the wireless connection between said end-user device and said local device has been established.

12. The method according to claim 11, wherein said Unique Device identification is the Universal Plug and Play identification of said local device, or its Media Access Control address.

13. The method as claimed in claim 1, wherein the remote request is provided by voice.

14. The method according to claim 1, wherein said applications are created by a remote operator in an editing software module on a personal computer, whereby said applications can be stored on said remote server and can be delivered in accordance with different parameters and rules defined by said operator.

15. The method according to claim 1, further comprising probing for a different Unique Device Name corresponding to a switch in the local device and displaying said appropriate application corresponding to said new contextual data corresponding to said local device corresponding to said new location.

16. The method according to claim 15, wherein the time spent by the end-user device in a particular location corresponding to a specific local device is recorded and said application user-interaction is stored.

17. A system for delivering temporarily a plurality of software applications each based on respective contextual data, to one or more wireless mobile end-user devices, by using a single application called contextual engine pre-installed in said one or more wireless mobile end-user devices, said delivery being limited to the immediate vicinity of specific locations, the system comprising:
   an end-user device storing said contextual engine, said end-user device being one of said one or more wireless mobile end-user devices,
   a remote server, and
   a local device connected to the remote server and located in the vicinity of one of said specific locations, and wherein
      the local device is configured to receive a remote request from said end-user device, when said end-user device is located near said local device, for retrieving one of said plurality of applications related to its respective contextual data,
      the local device is configured to receive said application from a remote server,
      the local device is configured to deliver, automatically via a wireless connection, said software application to said end-user device,
      said end-user device is configured to display said application,
      the contextual engine of the end-user device is configured to save one or several display components as dynamic cookies and to share said dynamic cookies with one or more users using a social networking site,
      the contextual engine is configured to detect an expiring period associated with said one or several display components and prevent said end-user device from operating said one or several display components once the expiring period is passed, and the contextual engine is configured to extend the expiring period through a transaction via said end-user device, and such transaction involves sharing, purchasing or trading points in exchange for extending said expiring period.

\* \* \* \* \*